Aug. 22, 1939.　　　　H. A. OSBORNE　　　　2,170,211
MACHINE TOOL
Filed Sept. 24, 1937
Fig. 1
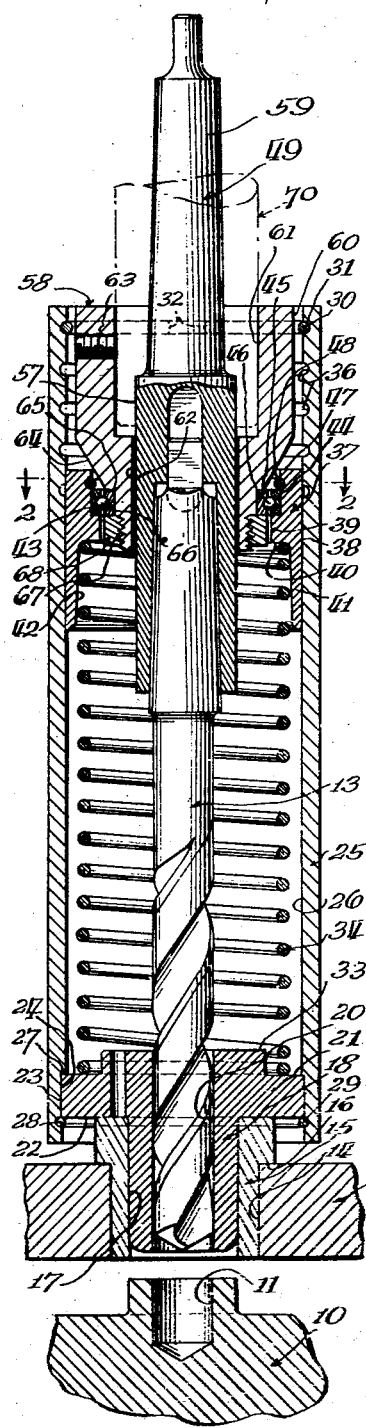
Fig. 3
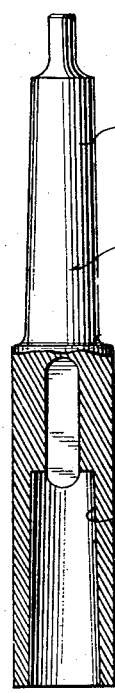
Fig. 4
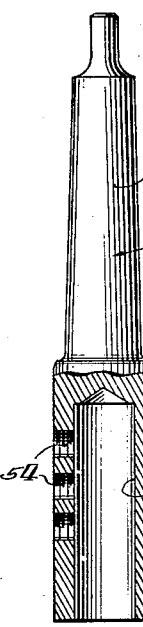
Fig. 5
Fig. 2
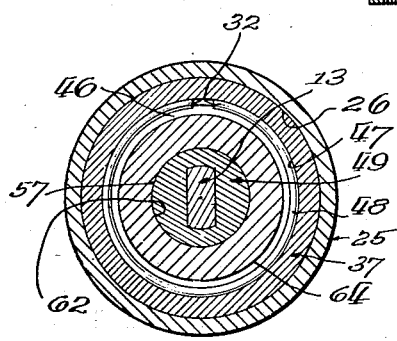
Inventor
Horace A. Osborne
By Williams, Bradbury, McCaleb & Hinkle
Attys.

Patented Aug. 22, 1939

2,170,211

UNITED STATES PATENT OFFICE 2,170,211

MACHINE TOOL

Horace A. Osborne, Racine, Wis., assignor of two-fifths to Webster Electric Company, Racine, Wis., a corporation of Wisconsin Application September 24, 1937, Serial No. 165,442

5 Claims. (Cl. 77—55)

The present invention relates to machine tools, and is particularly concerned with a bushing retainer attachment adapted to be used with machine tools, such as drills, reamers, or the like for supporting a bushing or bushings where one or more operations are to be performed through the same orifice in a machine, jig, fixture, or attachment.

One of the objects of the invention is the provision of an improved machine tool arrangement which is adapted to eliminate the use of loose bushings which are objectionable both on account of the slowness of operation and the ease with which such bushings may be mislaid or lost.

Another object is the provision of an improved bushing retainer structure by means of which a bushing of the correct size and dimension is movably supported in relation to a drill or other machine tool in such manner that the bushing can be used for aligning the tool in the correct operating position.

Another object of the invention is the provision of an improved bushing retaining structure of the class described in which the bushings may be very quickly changed and in which the tools may also be quickly changed.

Another object is the provision of an improved guide bushing arrangement in which the guide bushing ceases to revolve during the time it is performing its guiding function, and also in which the guide bushing revolves with the tool at all other times so as to prevent wear on the bushing structure.

Another object is the provision of a bushing retaining structure which is adapted to take care of various lengths of standard tools and the various types of shanks.

Other objects and advantages of the invention will be apparent from the following description and the accompanying drawing, in which similar characters of reference indicate similar parts throughout the several views.

Referring to the single sheet of drawings—

Fig. 1 is a vertical sectional view taken on a plane passing through the axis of the tool, with the tool in elevation;

Fig. 2 is a transverse section taken on a plane at right angles to the axis of the tool, the plane being shown by the lines 2—2 of Fig. 1;

Fig. 3 is a view showing another form of tool driver;

Fig. 4 is another modification of the tool driver; and

Fig. 5 is another modification.

Referring to Fig. 1, 10 indicates in its entirety a work piece in which a cylindrical bore 11 is to be made, and 12 indicates a part of the jig which holds the work piece 10 in proper position underneath the drill bit 13. The member 12 may be the upper or clamping plate of the jig holding the work piece 10, and it may be provided with a bore 14 having a guide sleeve 15 mounted in said bore, and provided with a radially extending shoulder 16 engaging the top of the plate 12.

The guide sleeve 15 has a cylindrical bore 17 which is adapted to slidably receive the bushing 18. The bushing 18 comprises a metal member of substantially cylindrical shape adapted to have a sliding fit in the bore 17 and provided with a centrally located bore 20 which is adapted to slidably and rotatably receive the drill bit 13.

The bushing 18 has a radially extending flange 21, the lower flat surface 22 of which engages the top of the guide 15. The outer edge of this flange 21 has a cylindrical surface 23 which is adapted to fit in a counterbore 24 in a tubular housing 25. The tubular housing 25 has a cylindrical bore 26 extending through it, the bore 26 being separated from the bore 24 by an annular shoulder 27 against which the flange 21 is seated.

On the side of the flange 21 opposite to the shoulder 27 the tubular housing 25 is provided with a groove 28 adapted to receive a split ring 29 which is similar to the ring 30 in the groove 31, used at the other end of the housing 25. The structure of one of these rings may be seen in Fig. 2, where it will be observed that it is a ring of round wire bent to substantially circular form and having its ends 32 spaced from each other sufficiently so that the ring may be sprung inward to get it out of the groove 28 or 31.

The split rings have an initial outward tension which causes them to spring into the grooves. The bushing 21 is thus fixedly secured in the housing 25, but may be very quickly removed by removing the ring 29. The bushing 18 is also preferably provided with an upwardly projecting cylindrical lug 33 on its upper side, about which the spring 34 may be located so that the spring is kept in alignment with the bushing and out of contact with the housing 25.

The spring 34 consists of a helical wire spring which is under some tension even when the spring is fully expanded in the housing 25. The position shown in Fig. 1 is that in which the spring 34 is partially contracted and the drill bit 13 is ready to enter the bore 11 or has just been removed from the bore.

The upper end of the housing 25 is preferably provided with a plurality of additional grooves 36 for receiving the split wire ring 30, in the event it is desired to use the bushing retainer attachment with shorter drills. The drills may be of various lengths, and as a long drill is used and resharpened it gradually decreases in length, and these additional grooves permit the attachment to be adapted in length to the drill bit.

The housing 25 also slidably supports a retaining ring 37 which consists of a tubular member having an outer cylindrical surface 38 adapted to be slidably mounted in the bore 26 of housing 25.

The retaining ring 37 is provided with an inwardly extending annular flange 39 which serves two purposes. The lower face 40 of the flange serves as a seat for the upper end of the spring 34. The lower skirt 41 of the retaining ring 37 serves to maintain the alignment of the spring 34 which the skirt 41 is adapted to receive.

The other purpose for the flange 39 is to provide an annular shoulder 43 for supporting the outer race 44 of a ball bearing. The race 44 is provided with the usual inner groove of half circular cross section for receiving the balls 45, and the balls engage inner race 46, which is likewise provided on its periphery with a suitable groove of the same shape.

The retaining ring 37 likewise has a groove 47 for receiving the split ring 48, which engages the upper face of the outer race 44 of the ball bearing.

The retaining ring 37 is urged upwardly by the spring 34, its upper limit of movement being determined by the location of the split wire ring 30, which may be in the groove 31 or any of the grooves 36.

The inner race 46 of the ball bearing is carried by what I prefer to call an adapter, and the adapter is so arranged that it will adapt the device for use with a plurality of different tool drivers 49.

In Fig. 3 of the drawing there is illustrated a drill driver 50 having a socket 51 of the Morse Stub Type No. 2.

In Fig. 4 there is illustrated a drill driver having a socket 53 for a straight shank drill of any size. The shank is held in place by the set screws 54.

In Fig. 5 is illustrated a drive shaft 55 having a socket 56 suitable for receiving a Morse Standard Shank No. 2. The outer cylindrical surface 57 of all of the drive shafts 49, 50, 52, 55 is substantially the same, so that they will all fit in the bore 62 of the adapter 58.

Each of the drive shafts or drill drivers mentioned also has an upper shank portion 59 which is adapted to fit in a suitable socket or chuck of a drill press. It should be understood that in addition to the drill drivers or shafts shown, any other drill size or drive may be used, such as, for example, a Glenzer drive, and others.

The adapter 58 comprises a substantially cylindrical metal body which is adapted to be received in the tubular housing 25, with a clearance between its outer cylindrical surface 60 and the inside of any of the split wire rings 30. The adapter has a centrally located bore 62, and may be provided with an upper counterbore 61, to fit the spindle 70 of a drill press or other machine. The bore 62 is adapted to receive any of the various drill drivers. A set screw 63 may pass through the wall of the adapter, and is adapted to engage the spindle of any of the drill drivers, fixedly securing the spindle with respect to the adapter. The bore 62 has a suitable clearance around surface 57. The spindle 70 may be regarded as a hollow drive shaft.

At its lower end the adapter may be provided with a tapered portion 64 so as to reduce its size gradually so that it can be received inside of the retaining ring. The adapter has an annular shoulder 65 which engages the upper face of the inner ball bearing race. It also has a reduced cylindrical surface 66 for receiving the inner ball bearing race and a reduced threaded portion 67 for receiving an annular nut 68.

The annular nut, when threaded on the reduced threaded portion 67, engages the lower face of the race 46 and clamps it to the adapter. There is a clearance between the nut 68 and all parts of the retaining ring 37 and a clearance between all parts of the adapter 58 and the housing 25 or the retaining ring 37.

Thus the adapter 58 is so arranged that it rotates freely with respect to the housing 25 by means of the ball bearing. The ball bearing may be of relatively light structure, such as is usually termed an "airplane ball bearing" and the friction of the ball bearing is such that when there is nothing engaging the bushing 21 the friction of the ball bearing and perhaps that of the drill bit in the guide bore 17 causes the housing 25 to rotate with the drill bit and adapter. Thus all wear on the ball bearing is avoided except when the drill is actually doing work.

The machine tool is illustrated in such position as it would assume when used with a drill press. It should be understood, however, that it may also be used where the part upon which the operation to be performed is subjected to rotation, and the cutting or operation tool held stationary. This might take place, for example, in a lathe.

The operation of the present machine tool attachment is as follows: The shank 49 is secured in the chuck or socket of a drill press, and subjected to rotation. The entire mechanism is lowered by means of the usual handle on a drill press, and at this time the complete housing and mechanism is in rotation. Upon contact of the bushing 21 with the liner bushing 15, the guide bushing 21 ceases to revolve, and the cutting tool or drill 13 continues to revolve in the guide bushing.

When the face 22 engages the upper surface of the liner bushing 15, the downward motion of the housing 25 ceases, and thereafter the adapter, drive shaft, and drill move downward, the retaining ring 37 sliding downward in the housing 25. The cutting or operating tool continues to advance through the guide bushing 15, while the balance of the mechanism, comprising the bushing 21 and housing 25, is at rest.

This compresses the spring 34, and this motion continues until the drill 13 has performed its work upon the work piece 10, such as, for example, making the bore 11. Upon the lifting of the handle of the drill press, the drill 13 is withdrawn, and the spring 34 expands, moving the retainer ring 37 upward until it hits the split ring 30. The tool is now ready for another operation, or a second cycle.

If the next operation is to be performed on another spindle or machine, where it is still necessary to guide the tool, another of these attachments may be used with a guide bushing of the same or different dimensions on the inner diameter, but having the same outer diameter, to contact the liner bushing.

Should the succeeding operation not require a guide bushing, no further attachment would be necessary, and the drill may be used with the attachment on it, just as though the attachment were not present. The liner bushing may be of sufficient size to admit the use of a tap, counterbore, or other tool of larger dimension than the original cutting or operating tool, such as the drill 13. Thus the jig is so adapted that it may be used with this drill, and thereafter be used with cutting tools of even larger diameter. A number of holes of different sizes may be bored by the use of a number of these attachments, and the drill may be suitably guided by the jig in each case.

The series of grooves which is provided at one end of the housing permits the adjustmnet of the device to compensate for wear of the tool, or to accommodate various lengths of standard tools. The split rings are very quickly removed, and new bushings may be very quickly assembled with the housing. The whole device may be dismantled by merely removing two split rings and one nut. When changing or sharpening tools, it is only necessary to release the set screw 63 in the adapter which holds the adapter to the spindle of the drill press or other machine, and thereafter the drill and drive shaft may be removed. In order to change the guide bushings 21, it is only necessary to remove the split ring 29 at the bottom of the housing and insert a new bushing, and then permit the split ring to spring back into place.

In some embodiments of the invention, parts 49 and 13 may be replaced by a single drill bit or other tool of sufficient length.

When the cutting tool is at rest, and out of operation, the entire mechanism revolves with it, thereby reducing wear on the ball bearing, and also preventing excessive wear on the guide bushing or other parts of the mechanism.

It should be understood that the present attachment may be used with various types of operating tools other than drills, and I do not wish to be limited to the specific example which has been selected to illustrate the invention.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a machine tool attachment, the combination of a tubular metal housing, said metal housing having a guide member removably secured in one end and provided with an aperture for guiding a drill or the like, with a sliding member mounted in said tubular metal housing, stop means at the end of said tubular metal housing for limiting the outer movement of said sliding member, spring means between said sliding member and said guide member, an anti-friction bearing carried by said sliding member, and a tool holder carried by said sliding member whereby the drill or the like may be rotated and reciprocated in said guide member and said guide member may be carried by said tool from one work piece to another.

2. In a machine tool attachment, the combination of a tubular metal housing, said metal housing having a guide member removably secured in one end and provided with an aperture for guiding a drill or the like, with a sliding member mounted in said tubular metal housing, stop means at the end of said tubular metal housing for limiting the outer movement of said sliding member, spring means between said sliding member and said guide member, an anti-friction bearing carried by said sliding member, and a tool holder carried by said sliding member whereby the drill or the like may be rotated and reciprocated in said guide member and said guide member may be carried by said tool from one work piece to another, said stop means comprising a substantially circular resilient spring member adapted to be received in a groove in said tubular member and projecting from said groove to engage said sliding member.

3. In a machine tool attachment, the combination of a tubular metal housing, said metal housing having a guide member removably secured in one end and provided with an aperture for guiding a drill or the like, with a sliding member mounted in said tubular metal housing, stop means at the end of said tubular metal housing for limiting the outer movement of said sliding member, spring means between said sliding member and said guide member, an anti-friction bearing carried by said sliding member, and a tool holder carried by said sliding member whereby the drill or the like may be rotated and reciprocated in said guide member and said guide member may be carried by said tool from one work piece to another, said stop means comprising a substantially circular resilient spring member adapted to be received in a groove in said tubular member and projecting from said grove to engage said sliding member, said tubular member having a plurality of similar grooves for the purpose of adjustably locating said stop member.

4. In a machine tool attachment, the combination of a tubular metal housing, said metal housing having a guide member removably secured in one end and provided with an aperture for guiding a drill or the like, with a sliding member mounted in said tubular metal housing, stop means at the end of said tubular metal housing for limiting the outer movement of said sliding member, spring means between said sliding member and said guide member, an anti-friction bearing carried by said sliding member, and a tool holder carried by said sliding member whereby the drill or the like may be rotated and reciprocated in said guide member and said guide member may be carried by said tool from one work piece to another, said guide member being seated against a shoulder in said tubular member and having a substantially circular spring member arranged in a groove in said tubular member and engaging the outer surface of said guide member.

5. In a machine tool attachment, the combination of a tubular metal housing, said metal housing having a guide member removably secured in one end and provided with an aperture for guiding a drill or the like, with a sliding member mounted in said tubular metal housing, stop means at the end of said tubular metal housing for limiting the outer movement of said sliding member, spring means between said sliding member and said guide member, an anti-friction bearing carried by said sliding member, and a tool holder carried by said sliding member whereby the drill or the like may be rotated and reciprocated in said guide member and said guide member may be carried by said tool from one work piece to another, said sliding member being formed with an annular seat, and a retaining flange, and said guide member being formed with an alignment lug for supporting both ends of said spring in spaced relation to said tubular member.

HORACE A. OSBORNE.